US012331923B2

(12) United States Patent
Yoshida

(10) Patent No.: US 12,331,923 B2
(45) Date of Patent: Jun. 17, 2025

(54) OPTICAL MEMBER AND LIGHT SOURCE MODULE

(71) Applicant: NICHIA CORPORATION, Anan (JP)

(72) Inventor: Norimasa Yoshida, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/675,820

(22) Filed: May 28, 2024

(65) Prior Publication Data

US 2024/0401772 A1 Dec. 5, 2024

(30) Foreign Application Priority Data

May 31, 2023 (JP) ................................ 2023-089702

(51) Int. Cl.

*F21V 5/00* (2018.01)
*F21V 5/04* (2006.01)
*F21Y 105/16* (2016.01)
*F21Y 113/00* (2016.01)

(52) U.S. Cl.

CPC ................ *F21V 5/007* (2013.01); *F21V 5/04* (2013.01); *F21Y 2105/16* (2016.08); *F21Y 2113/00* (2013.01)

(58) Field of Classification Search

CPC ........ F21V 5/007; F21V 5/04; F21Y 2105/16; F21Y 2113/00

See application file for complete search history.

(56) References Cited

U.S. PATENT DOCUMENTS 4,770,514 A * 9/1988 Silverglate ......... G02B 19/0061 359/728
4,904,062 A * 2/1990 Morishita ................ G02B 3/00 359/708
6,367,950 B1 * 4/2002 Yamada ................ F21S 43/249 362/241
6,870,681 B1 * 3/2005 Magee ................. G02B 3/0056 359/619
7,496,270 B2 * 2/2009 Kim .................. B29C 45/14655 385/147
10,816,165 B2 * 10/2020 McCracken, Jr. ...... F21V 13/04
2012/0307495 A1 * 12/2012 Shih .................. G02B 19/0066 362/237

(Continued)

FOREIGN PATENT DOCUMENTS

JP S61-039803 U 3/1986
JP S61-042002 U 3/1986
JP 2001-250986 A 9/2001

(Continued)

*Primary Examiner* — Tsion Tumebo
(74) *Attorney, Agent, or Firm* — Foley & Lardner LLP

(57) ABSTRACT

An optical member includes: a plurality of light controllers, each including: a first surface, a convex surface that is located opposite to the first surface and is curved in a direction away from the first surface, and a concave surface that opens at the first surface and is curved from the first surface toward the convex surface. A radius of curvature of the concave surface is less than a radius of curvature of the convex surface. In a plan view, a center of the concave surface coincides with a center of the convex surface. A first distance from the first surface to a topmost portion of the convex surface is 4.5 times or more a second distance from the first surface to a deepest portion of the concave surface.

16 Claims, 13 Drawing Sheets

1

(56) References Cited

U.S. PATENT DOCUMENTS

2013/0088871 A1 4/2013 Yun et al.

FOREIGN PATENT DOCUMENTS

| | | | |
|---|---|---|---|
| JP | 2013-140804 | A | 7/2013 |
| JP | 2015-222670 | A | 12/2015 |
| JP | 2017-120687 | A | 7/2017 |
| JP | 2019-200999 | A | 11/2019 |
| JP | 2020-118925 | A | 8/2020 |
| WO | WO-2022/149359 | A1 | 7/2022 |

* cited by examiner

| | | SAMPLE 1 | | SAMPLE 2 | | SAMPLE 3 | | SAMPLE 4 | | SAMPLE 5 | | SAMPLE 6 | |
|---|---|---|---|---|---|---|---|---|---|---|---|---|---|
| SHAPE OF LIGHT CONTROLLER | |  | |  | |  | |  | |  | |  | |
| AMOUNT OF DEVIATION [mm] OF LIGHT SOURCE | | 0 | 0.4 | 0 | 0.4 | 0 | 0.4 | 0 | 0.4 | 0 | 0.4 | 0 | 0.4 |
| CONDI-TIONS | RADIUS OF CURVATURE [mm] OF CONVEX SURFACE | R5.1 | | R5.1 | | R5.1 | | R5.1 | | R5.1 | | R5.1 | |
| | RADIUS OF CURVATURE [mm] OF CONCAVE SURFACE | R2.05 | | – | | R2.05 | | R2.05 | | R10 | | R10 | |
| | FISRT DISTANCE L1 [mm] | 8.1 | | 6.2 | | 6.1 | | 7.1 | | 8.1 | | 6.1 | |
| | SECOND DISTANCE L2 [mm] | 1.8 | | – | | 1.8 | | 1.8 | | 0.9 | | 0.9 | |
| | FISRT DISTANCE L1/ SECOND DISTANCE L2 | 4.5 | | – | | 3.4 | | 3.9 | | 9.0 | | 6.8 | |
| RESULTS | AMOUNT OF CHANGE IN PEAK ANGLE [°] | −0.1 | | 4.5 | | −11.8 | | −3.2 | | 3.3 | | 4.7 | |
| | FWHM [°] | 30 | 30 | 29 | 28 | 55 | 54 | 41 | 40 | 21 | 20 | 33 | 33 |

OPTICAL MEMBER AND LIGHT SOURCE MODULE

CROSS-REFERENCE TO RELATED APPLICATIONS

This application is based on and claims priority to Japanese Patent Application No. 2023-089702, filed on May 31, 2023, the entire contents of which are incorporated herein by reference.

TECHNICAL FIELD

The present disclosure relates to an optical member and a light source module.

BACKGROUND

Japanese Patent Publication No. 2020-118925 describes a display device that includes a substrate on which light emitting diodes are two-dimensionally arranged, and lenses formed in one-to-one correspondence with the light emitting diodes and configured to converge light beams from the light emitting diodes.

SUMMARY

It is an object of an embodiment of the present disclosure to reduce, in a case where a light controller of an optical member is disposed above a light source, an optical axis deviation caused by a positional deviation between the light source and the light controller in the optical member.

An optical member according to an embodiment of the present disclosure includes a plurality of light controllers. Each of the plurality of light controllers includes a first surface, a convex surface that is located opposite to the first surface and is curved in a direction away from the first surface, and a concave surface that opens at the first surface and is curved from the first surface toward the convex surface. A radius of curvature of the concave surface is smaller than a radius of curvature of the convex surface. A center of the concave surface coincides with a center of the convex surface in a plan view. A first distance from the first surface to a topmost portion of the convex surface is 4.5 times or more a second distance from the first surface to a deepest portion of the concave surface.

BRIEF DESCRIPTION OF THE DRAWINGS

Other objects and further features of the present disclosure will be apparent from the following detailed description when read in conjunction with the accompanying drawings, in which.

DETAILED DESCRIPTION

Figure 1:
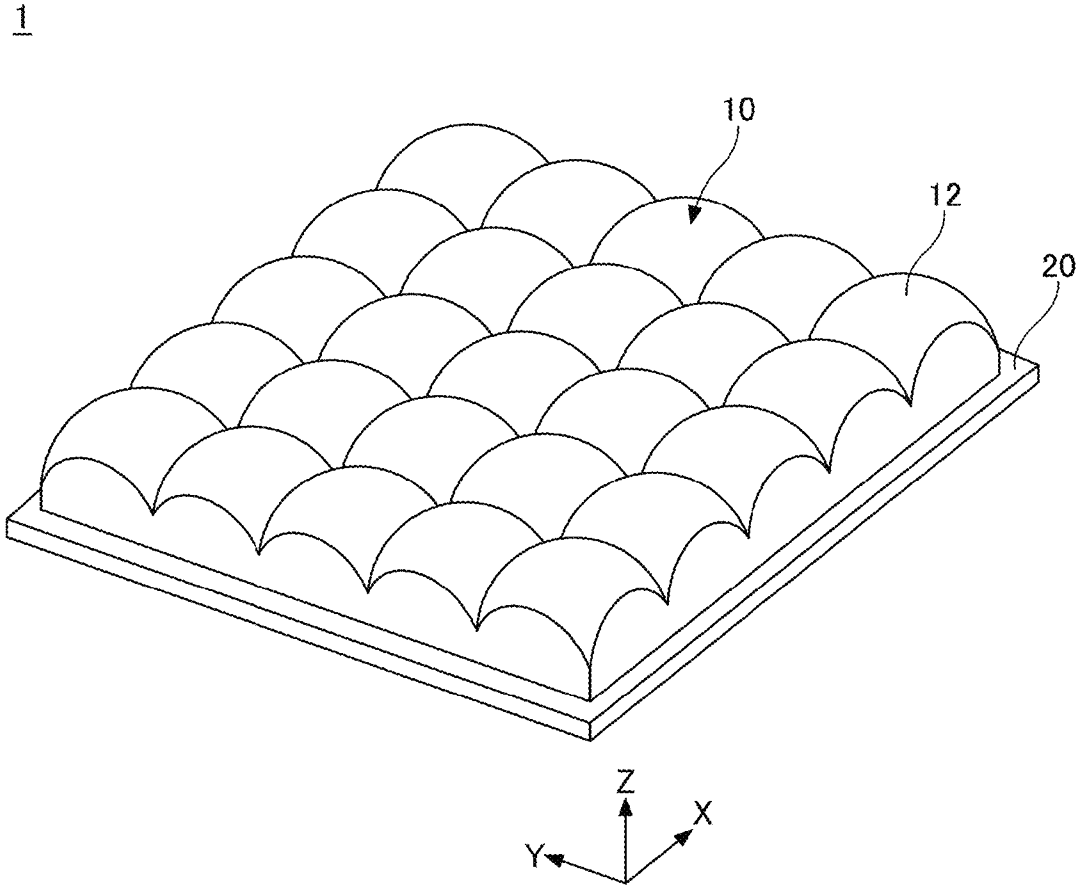
FIG. 1 is a schematic perspective view of an optical member according to a first embodiment.

In the following, embodiments of the present disclosure will be described with reference to the drawings. In the following description, terms indicating specific directions and positions (for example, "upper", "upward", "lower", "downward", and other terms including these terms) are used as necessary. These terms are used to facilitate understanding of the present invention with reference to the drawings, and the technical scope of the present invention is not limited by the meaning of these terms. The same reference numerals appearing in a plurality of drawings refer to the same or similar portions or members.

Further, the following embodiments exemplify an optical member and the like to embody the technical idea of the present invention, and the present invention is not limited to the following description. In addition, unless otherwise specified, the dimensions, materials, shapes, relative arrangements, and the like of components described below are not intended to limit the scope of the present invention thereto, but are described as examples. The contents described in one embodiment can be applied to other embodiments and modifications. The sizes, positional relationships, and the like of members illustrated in the drawings may be exaggerated for clearer illustration. Furthermore, in order to avoid excessive complication of the drawings, a schematic view in which some elements are not illustrated may be used, or an end view illustrating only a cut surface may be used as a cross-sectional view.

First Embodiment (Optical Member 1)

Figure 2:
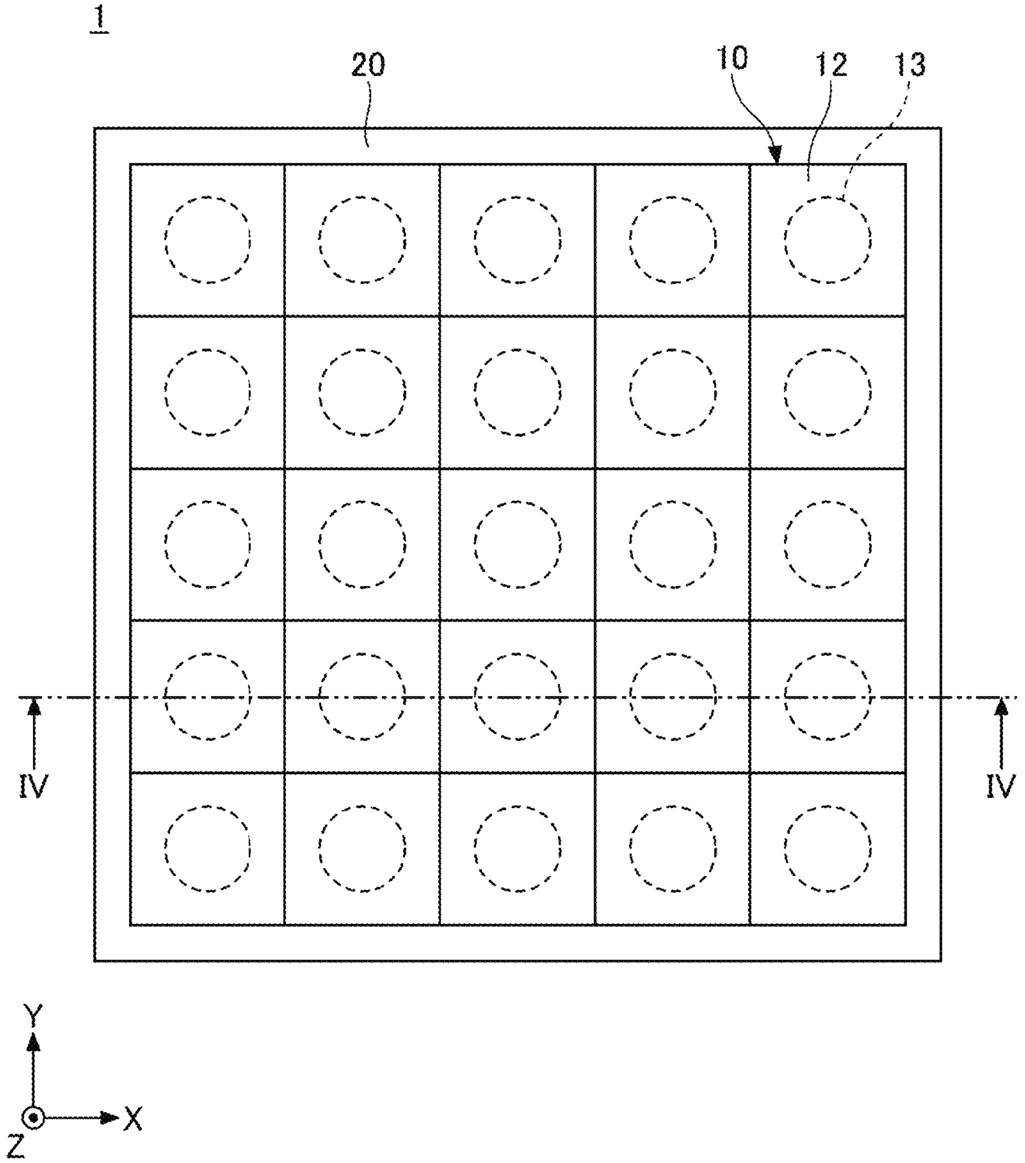
FIG. 2 is a schematic top view of the optical member according to the first embodiment.
Figure 3:
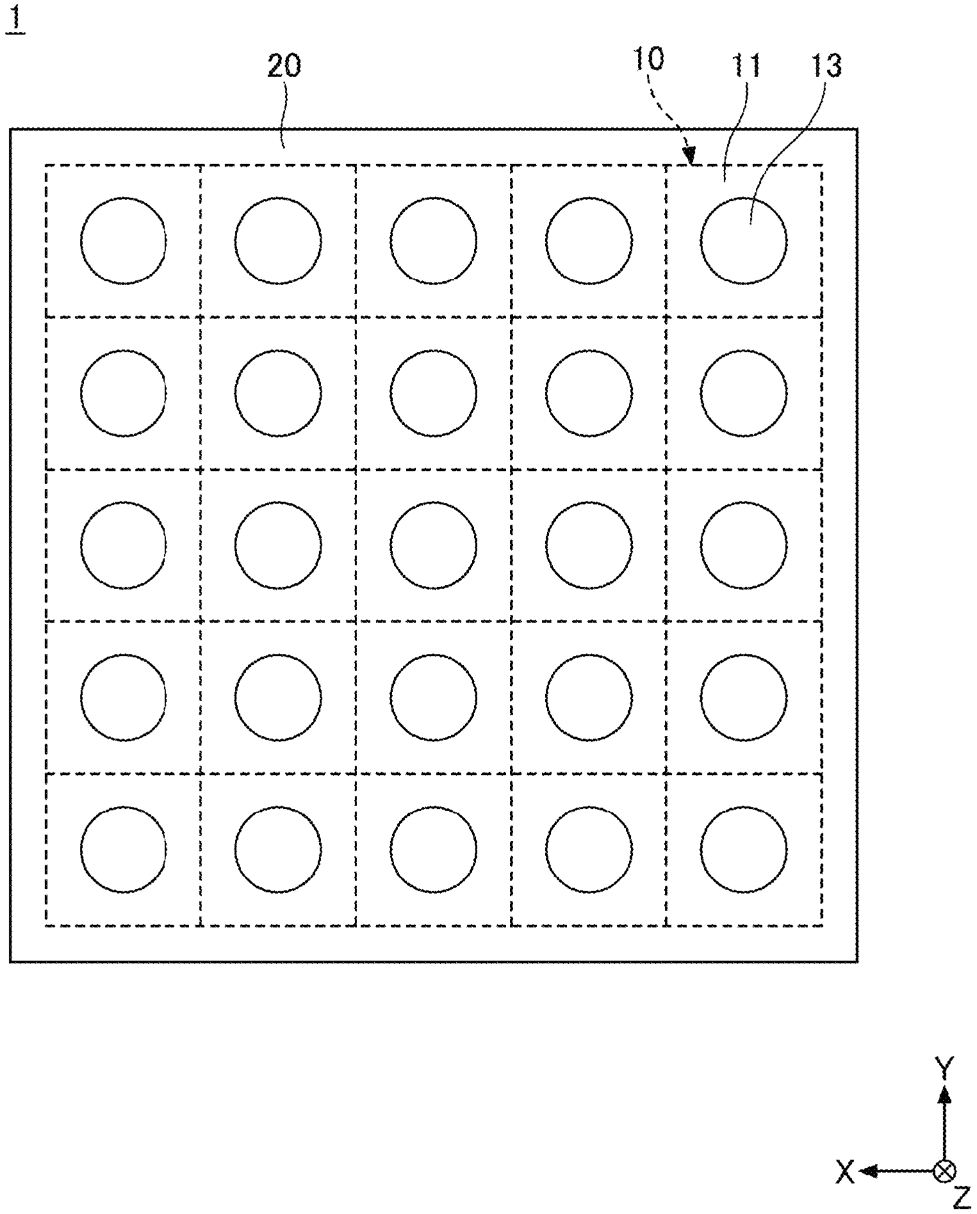
FIG. 3 is a schematic bottom view of the optical member according to the first embodiment.
Figure 4:
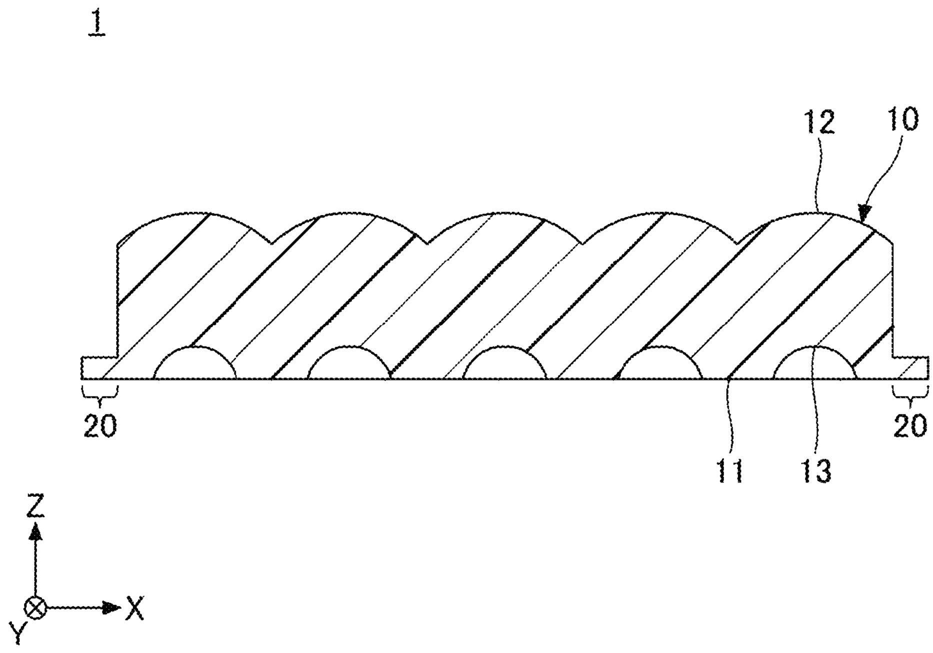
FIG. 4 is a schematic cross-sectional view of the optical member taken through line IV-IV of FIG. 2.
Figure 5:
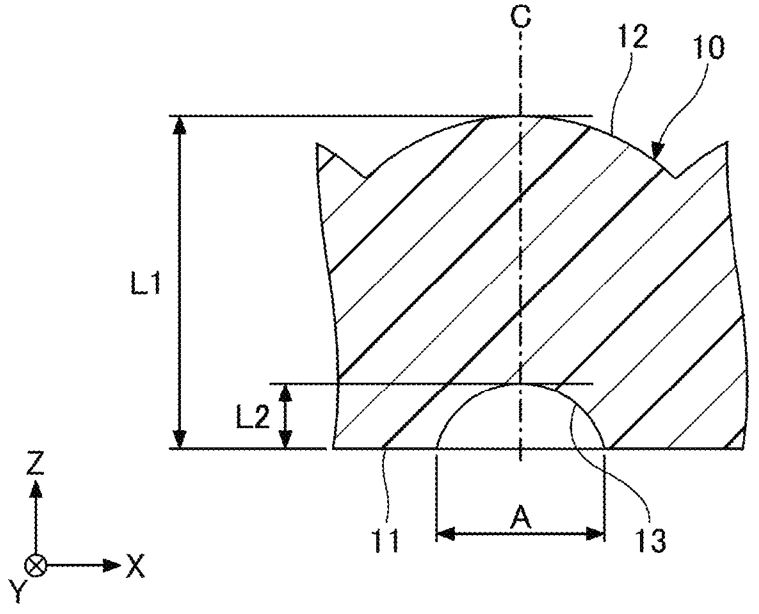
FIG. 5 is a schematic partial cross-sectional view of the optical member according to the first embodiment.

FIG. 1 is a schematic perspective view of an optical member according to a first embodiment. FIG. 2 is a schematic plan view of the optical member according to the first embodiment. FIG. 3 is a schematic bottom view of the optical member according to the first embodiment. FIG. 4 is a schematic cross-sectional view of the optical member according to the first embodiment, taken through line IV-IV of FIG. 2. FIG. 5 is a schematic partial cross-sectional view of the optical member according to the first embodiment. In FIG. 1 to FIG. 5, an X-axis, a Y-axis, and a Z-axis that are orthogonal to one another are illustrated for reference.

As illustrated in FIG. 1 to FIG. 5, the optical member 1 includes a plurality of light controllers 10. In the example of FIG. 1 to FIG. 5, the light controllers 10 are two-dimensionally arranged in a matrix of five rows and five columns. In other words, the light controllers 10 are arranged in a square grid pattern. The light controllers 10 are arranged at a constant pitch in the X-axis direction and the Y-axis direction, for example. The arrangement of the light controllers 10 is not limited to the example of FIG. 1 to FIG. 5. The light controllers 10 may be arranged in a hexagonal grid pattern, for example.

Each of the light controllers 10 has, for example, a quadrangular shape in a plan view. Each of the light controllers 10 may have a square shape or a rectangular shape in a plan view. Each of the light controllers 10 includes a first surface 11, a convex surface 12, and a concave surface 13. The convex surface 12 is located opposite to the first surface 11 and is curved in a direction away from the first surface 11. The concave surface 13 opens at the first surface 11 and is curved from the first surface 11 toward the convex surface 12.

In the example of FIG. 1 to FIG. 5, the optical member 1 includes a frame portion 20 that surrounds the plurality of light controllers 10 in a plan view. The frame portion 20 is provided on the first surface 11 side of the light controllers 10 in the Z-axis direction. The lower surface of the frame portion 20 may or may not be coplanar with the first surface 11 of each of the light controllers 10. The optical member 1 does not necessarily include the frame portion 20.

In each of the light controllers 10, the first surface 11 is a flat surface. In the example of FIG. 1 to FIG. 5, the first surface 11 is parallel to the XY plane. The convex surface 12 is a portion of a sphere. The concave surface 13 is a portion of a sphere. The radius of curvature of the concave surface 13 is smaller than the radius of curvature of the convex surface 12. The ratio of the radius of curvature of the convex surface 12 to the radius of curvature of the concave surface 13 is, for example, 2 or more and 3.5 or less.

The convex surface 12 has, for example, a quadrangular shape in a plan view. The convex surface 12 may have a square shape or may have a rectangular shape in a plan view. The length of one side of the convex surface 12 is, for example, 1 mm or more and 20 mm or less in a plan view. An opening of the concave surface 13 has a circular shape having a diameter A in a plan view. The diameter A is, for example, 0.5 mm or more and 10 mm or less. The concave surface 13 preferably overlaps the convex surface 12 in a plan view.

In FIG. 5, C is a straight line connecting the center of the concave surface 13 and the center of the convex surface 12 in a plan view, and indicates the optical axis of a corresponding one of the light controllers 10. The straight line is parallel to the Z-axis, and perpendicularly intersects the XY plane including the first surface 11. That is, the center of the concave surface 13 coincides with the center of the convex surface 12 in a plan view. The center of the concave surface 13 and the center of the convex surface 12 are located at the center of the corresponding one of the light controllers 10 in a plan view. When the center of the concave surface 13 coincides with the center of the convex surface 12 in a plan view, it means that a distance between the center of the convex surface 12 and the center of the concave surface 13 in a plan view is 0.1 mm or less.

A first distance L1 from the first surface 11 to the topmost portion of the convex surface 12 is 4.5 times or more a second distance L2 from the first surface 11 to the deepest portion of the concave surface 13. The first distance L1 is, for example, 0.8 mm or more and 16 mm or less. Further, the second distance L2 is, for example, 0.17 mm or more and 3.4 mm or less.

A polycarbonate resin, an acrylic resin, a cycloolefin polymer (COP), a silicone resin, or the like can be used for the light controllers 10. The pitch between adjacent ones of the light controllers 10 can be 0.5 mm or more and 1.5 mm or less. As used herein, the pitch refers to a distance connecting the centers of two adjacent ones of the light controllers 10. The light controllers 10 can be produced by, for example, resin molding. In a case where the optical member 1 includes the frame portion 20, the frame portion 20 can be integrally produced by using the same material as the light controllers 10, for example.

As described, in each of the light controllers 10 of the optical member 1, the radius of curvature of the concave surface 13 is smaller than the radius of curvature of the convex surface 12, the center of the concave surface 13 coincides with the center of the convex surface 12 in a plan view, and further, the first distance L1 is 4.5 times or more the second distance L2. Accordingly, in a case where the optical member 1 is used in combination with a light source, and a light controller 10 is disposed above the light source (for example, see FIG. 12 described below), an optical axis deviation caused by a positional deviation between the light source and the light controller 10 can be reduced.

As used herein, the "optical axis deviation" caused by the light source and the light controller 10 refers to a change in the peak angle of light emitted from the light controller 10, with respect to the positional deviation between the optical axis of the light source and the center of the light controller 10. That is, the optical member 1 can reduce the amount of change in the peak angle of light emitted from the light controller 10, with respect to the positional deviation between the optical axis of the light source and the center of the light controller 10. This will be further described with reference to FIG. 6. The peak angle is an angle at which the luminance is maximized in the angular distribution of the intensity of light emitted from the convex surface 12 of the light controller 10. The peak angle is indicated by using the optical axis of the light controller 10 (the center of the light controller 10) as a reference (0°).

Figure 6:
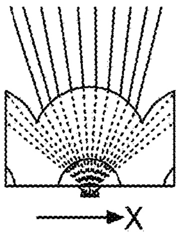
FIG. 6 is a diagram illustrating simulation results of optical paths of light incident on light controllers.
Figure 6:
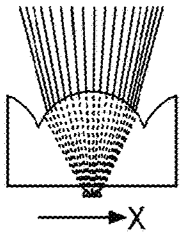
Figure 6:
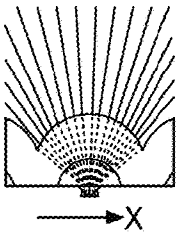
Figure 6:
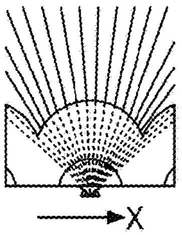
Figure 6:
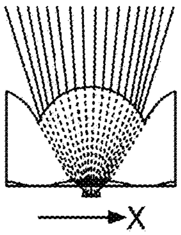
Figure 6:
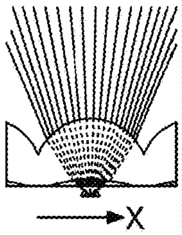

FIG. 6 illustrates simulation results of optical paths of light incident on light controllers. For each of six samples of light controllers having different shapes, full width at half maximum (FWHM) values and the amount of change in the peak angle of light, which was emitted from a convex surface after entering a first surface from a light source, were analyzed when the light traveling along the optical axis of the light source was incident on the center of a light controller in a plan view and when the light was incident on a position deviated from the center of the light controller by 0.4 mm in the positive X-axis direction.

In the samples 1 to 6, the widths of the light controllers in the X-axis direction and the Y-axis direction in a plan view are set to 7 mm. In the samples 1 and 3 to 6, the topmost portions of convex surfaces and the deepest portions of concave surfaces are located at the center of the light controllers in a plan view. In the sample 2, the topmost portion of a convex surface is located at the center of the light controller in a plan view. As light sources, light emitting devices with Lambertian light distribution are used. Each of the light emitting devices is 1 mm square in size in a plan view. The design target of the full width at half maximum (FWHM) is 35° or less.

In the samples 1 to 6, the radii of curvature of the convex surfaces are the same. The sample 1 is an example according to the first embodiment, and the sample 2 is a comparative example. The first distance L1 of the sample 2 is shorter than the first distance L1 of the sample 1, and the sample 2 does not have a concave surface. The first distance L1 of the sample 3 is 2 mm shorter than the first distance L1 of the sample 1. The first distance L1 of the sample 4 is 1 mm shorter than the first distance L1 of the sample 1. The radius of curvature of the concave surface of the sample 5 is larger than that of the sample 1. The first distance L1 of the sample 6 is shorter than that of the sample 1, and the radius of curvature of the concave surface of the sample 6 is larger than that of the sample 1.

Figure 7A:
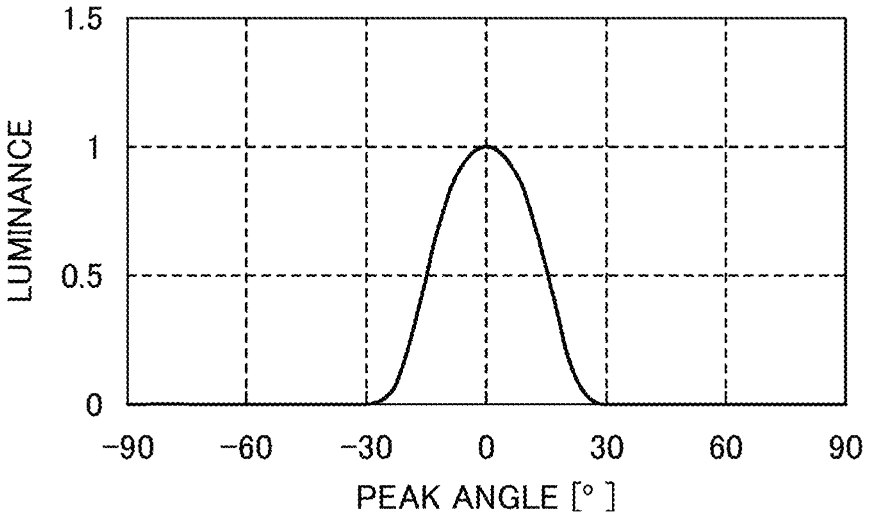
FIG. 7A and FIG. 7B are graphs (part 1) illustrating the angular distribution of light emitted from a convex surface.
Figure 7B:
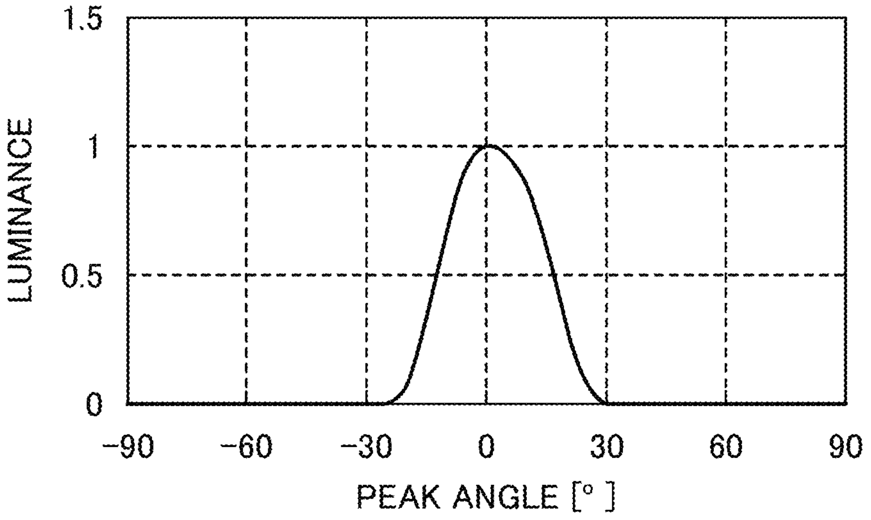
Figure 8A:
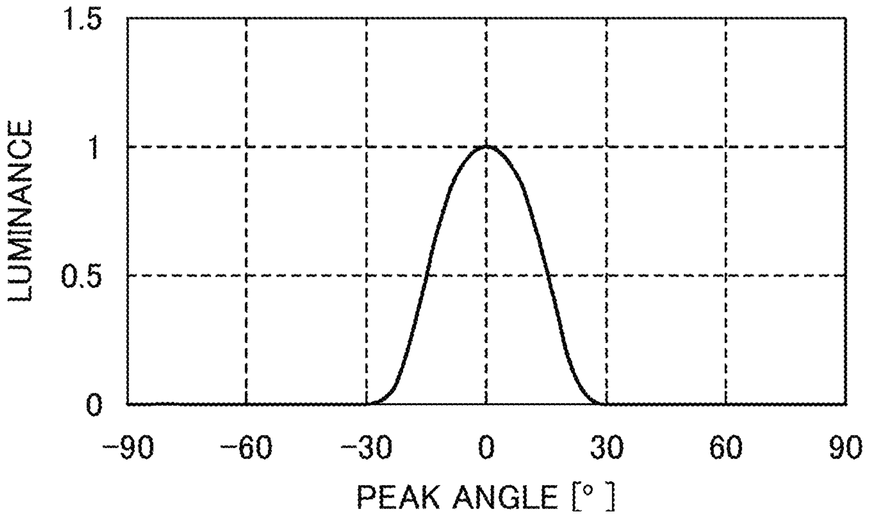
FIG. 8A and FIG. 8B are graphs (part 2) illustrating the angular distribution of light emitted from a convex surface.
Figure 8B:
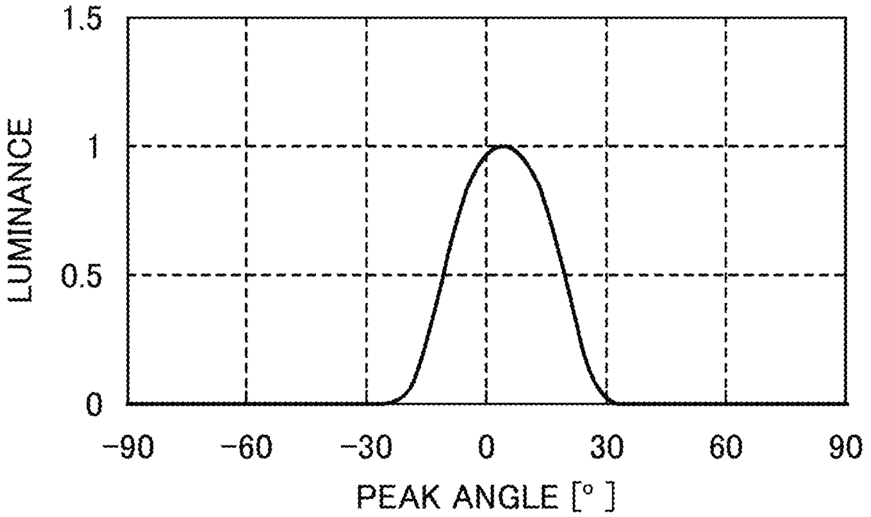

FIG. 7A to FIG. 8B illustrate the angular distribution of light emitted from the convex surfaces of the samples 1 and 2 as representatives. FIG. 7A and FIG. 7B illustrate the angular distribution of light emitted from the convex surface of the sample 1. FIG. 7A illustrates a case where the amount of deviation of the light source is 0 mm, and FIG. 7B illustrates a case where the amount of deviation of the light source in the positive X-axis direction is 0.4 mm. FIG. 8A and FIG. 8B illustrate the angular distribution of light emitted from the convex surface of the sample 2. FIG. 8A illustrates a case where the amount of deviation of the light source is 0 mm, and FIG. 8B illustrates a case where the amount of deviation of the light source in the positive X-axis direction is 0.4 mm. In FIG. 7A to FIG. 8B, the horizontal axis represents the peak angle, and the vertical axis represents the normalized luminance.

As illustrated in FIG. 6 and FIGS. 7A and 7B, in the sample 1, the absolute value of the amount of change in the peak angle is 0.1°, which is very small, as is preferable. In contrast, as illustrated in FIG. 6 and FIGS. 8A and 8B, in the samples 2 to 6, the absolute values of the amounts of change in the peak angles is 3.2° or more, which are larger than that of the sample 1.

Specifically, when the sample 1 and the sample 2 are compared, the absolute value of the amount of change in the peak angle increases in the light controller that does not have a concave surface, while there is no significant difference in the full width at half maximum (FWHM) between the sample 1 and the sample 2.

Further, when the sample 1 and the samples 3 and 4 are compared, it can be seen that, as the first distance L1 decreases, the full width at half maximum (FWHM) increases and light beams become less likely to be condensed. Further, when the sample 1 and the sample 4 are compared, it can be seen that, by causing the first distance L1 of the sample 4 to be 1 mm shorter than that of the sample 1, the absolute value of the amount of change in the peak angle of the sample 4 is much larger than that of the sample 1.

Further, when the sample 1 and the sample 5 are compared, it can be seen that, even when the first distance L1 of the sample 5 is the same as that of the sample 1, the absolute value of the amount of change in the peak angle of the sample 5 is much larger than that of the sample 1 when the radius of curvature of the concave surface of the sample 5 is larger than that of the sample 1 and the second distance L2 of the sample 5 is shorter than that of the sample 1. Further, according to the sample 6, it can be seen that, even when the first distance L1 of the sample 6 is reduced as compared to that of the sample 5, the absolute value of the amount of change in the peak angle of the sample 6 is much larger than that of the sample 1 and is not improved. By increasing the value of the first distance L1 with respect to the second distance L2, the trajectory of a light beam traveling inside a lens is extended, and the position of the intersection between the light beam and the emission surface can be changed, and as a result, the amount of change in the peak angle can be reduced.

As described, the amount of change in the peak angle of light, emitted from a light controller, with respect to a positional deviation between the optical axis of a light source and the center of the light controller can be reduced when the radius of curvature of a concave surface of the light controller is smaller than the radius of curvature of a convex surface of the light controller, and the first distance L1 is 4.5 times or more the second distance L2.

Further, from other simulation results, the first distance L1 is preferably six times or less the second distance L2. Further, from the other simulation results, the radius of curvature of the concave surface is preferably 2/7 times or more and 1/2 times or less the radius of curvature of the convex surface. Within such ranges, the amount of change in the peak angle can be reduced to 1.0° or less, which is a practically sufficient value.

(Optical Members According to Modifications)

Figure 9:
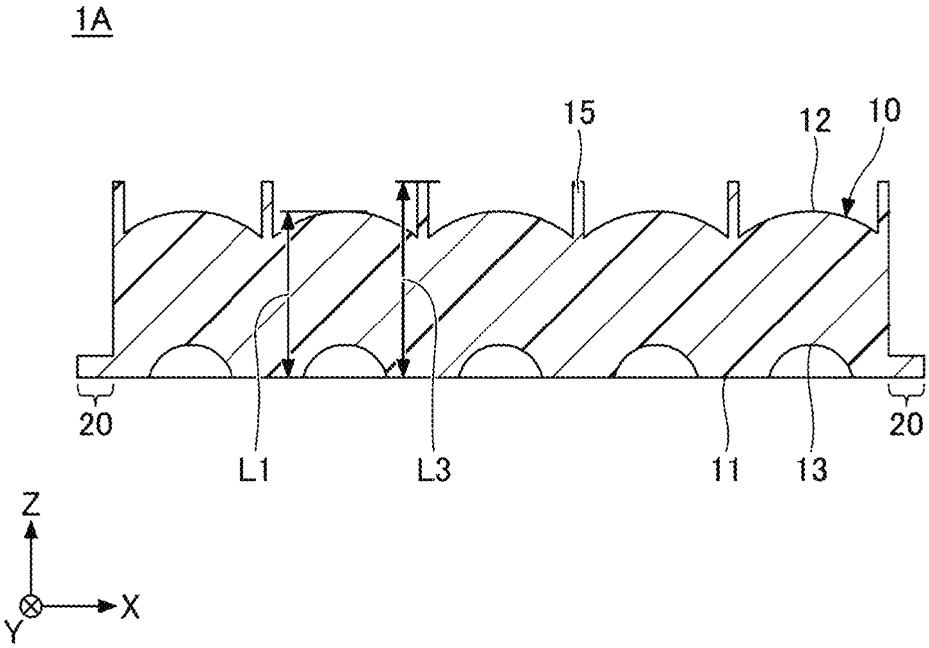
FIG. 9 is a schematic cross-sectional view of an optical member according a first modification of the first embodiment.

FIG. 9 is a schematic cross-sectional view of an optical member according a first modification of the first embodiment. As illustrated in FIG. 9, an optical member 1A differs from the optical member 1 in that the optical member 1A includes a projecting portion 15 located between adjacent light controllers 10 and extending in a direction away from a first surface 11.

The projecting portion 15 can be, for example, a wall that extends in the Y-axis direction and is located between light controllers 10 adjacent to each other in the X-axis direction. The projecting portion 15 may be a wall that extends in the X-axis direction and is located between light controllers 10 adjacent to each other in the Y-axis direction. The projecting portion 15 may be a grid-shaped wall that extends between light controllers 10 adjacent to each other in the X-axis direction and the Y-axis direction. Alternatively, the projecting portion 15 is not a wall, and may be a plurality of pillars separated from each other in the X-axis direction and/or the Y-axis direction.

Between two adjacent light controllers 10, light from both of the adjacent light controllers 10 are combined, and thus a bright line is likely to be generated. In the optical member 1A, the projecting portion 15 is provided between the adjacent light controllers 10, and thus light from both of the adjacent light controllers 10 is less likely to be combined. Therefore, the luminance of the bright line generated between the adjacent light controllers 10 can be reduced.

In the optical member 1A, a third distance L3 from the first surface 11 to the topmost portion of the projecting portion 15 is preferably longer than the first distance L1. The third distance L3 may be equal to or shorter than the first distance L1. By setting the third distance L3 to be larger than the first distance L1 and setting a value obtained by subtracting the first distance L1 from the third distance L3 to be equal to or less than one tenth of the first distance L1, the effect of reducing the luminance of the bright line is further increased.

Figure 10:
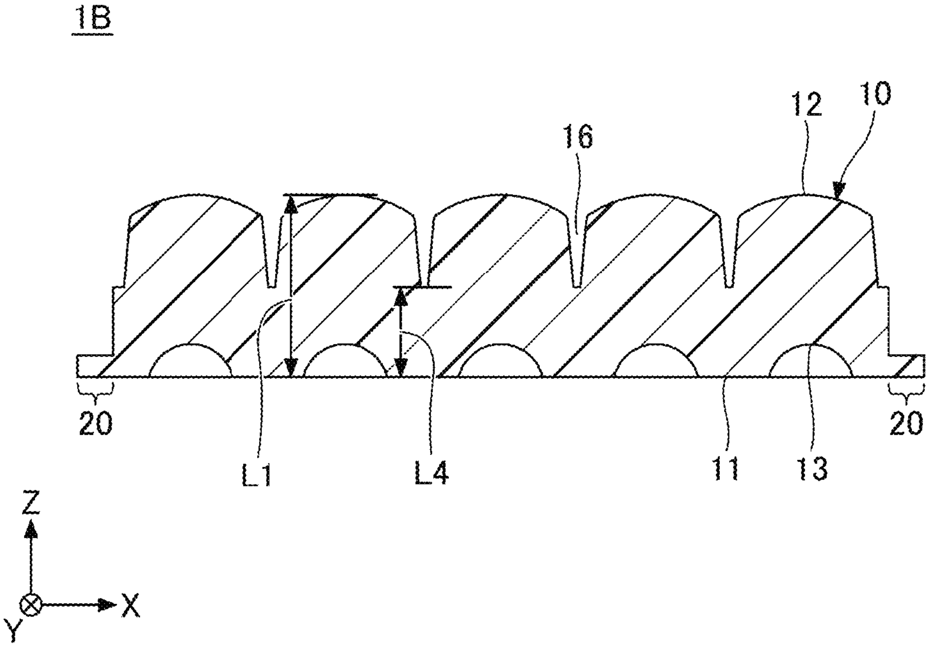
FIG. 10 is a schematic cross-sectional view of an optical member according to a second modification of the first embodiment.

FIG. 10 is a schematic cross-sectional view of an optical member according to a second modification of the first embodiment. As illustrated in FIG. 10, an optical member 1B differs from the optical member 1 in that the optical member 1B includes a recessed portion 16 located between adjacent light controllers 10 and is recessed toward a first surface 11.

The recessed portion 16 can be, for example, a groove that extends in the Y-axis direction and is located between light controllers 10 adjacent to each other in the X-axis direction.

The recessed portion 16 may be a groove that extends in the X-axis direction and is located between light controllers 10 adjacent to each other in the Y-axis direction. The recessed portion 16 may be a grid-shaped groove that extends between light controllers 10 adjacent to each other in the X-axis direction and the Y-axis direction. Alternatively, the recessed portion 16 is not a groove that is continuous in the X-axis direction and/or the Y-axis direction, and may be a plurality of grooves separated from each other in the X-axis direction and/or the Y-axis direction.

Between two adjacent light controllers 10, light from both of the adjacent light controllers 10 are combined, and thus a bright line is likely to be generated. The optical member 1B includes the recessed portion 16 between the adjacent light controllers 10, and thus light from both of the adjacent light controllers 10 is less likely to be combined. Therefore, the luminance of the bright line generated between the adjacent light controllers 10 can be reduced. Light traveling from both of the adjacent light controllers 10 to the recessed portion 16 is scattered by the recessed portion 16, and thus the light from both of the adjacent light controllers 10 is unlikely to be combined.

In the optical member 1B, a fourth distance L4 from the first surface 11 to the deepest portion of the recessed portion 16 is shorter than the first distance L1.

(Light Source Module 300)

Figure 11:
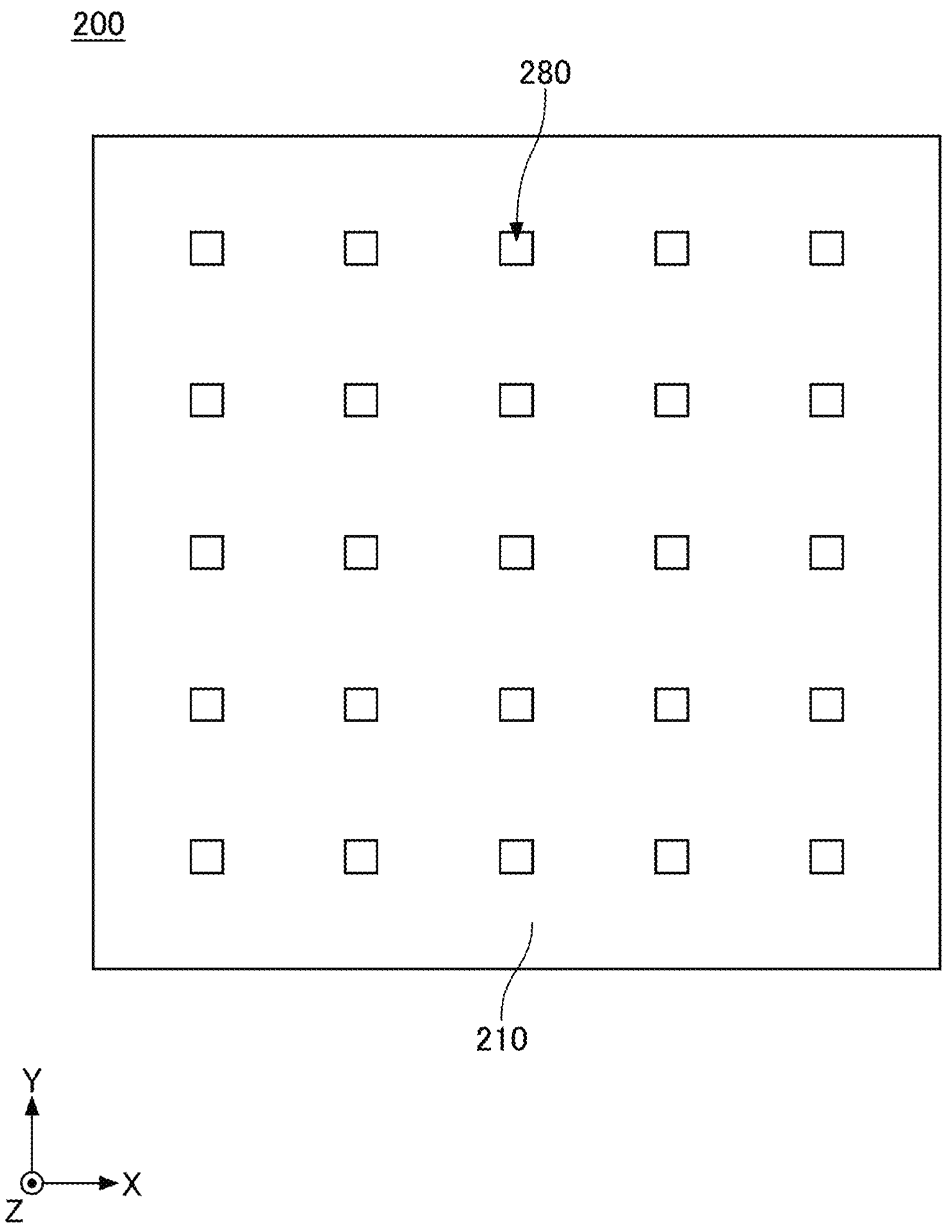
FIG. 11 is a schematic plan view of a planar light source.

A light source module including a planar light source and the optical member will be described below. First, the planar light source will be described. FIG. 11 is a schematic plan view of the planar light source. A planar light source 200 illustrated in FIG. 11 includes a substrate 210 and a plurality of light sources 280 arranged on the substrate 210. The plurality of light sources 280 are, for example, two-dimensionally arranged on the substrate 210 in a matrix.

Figure 12:
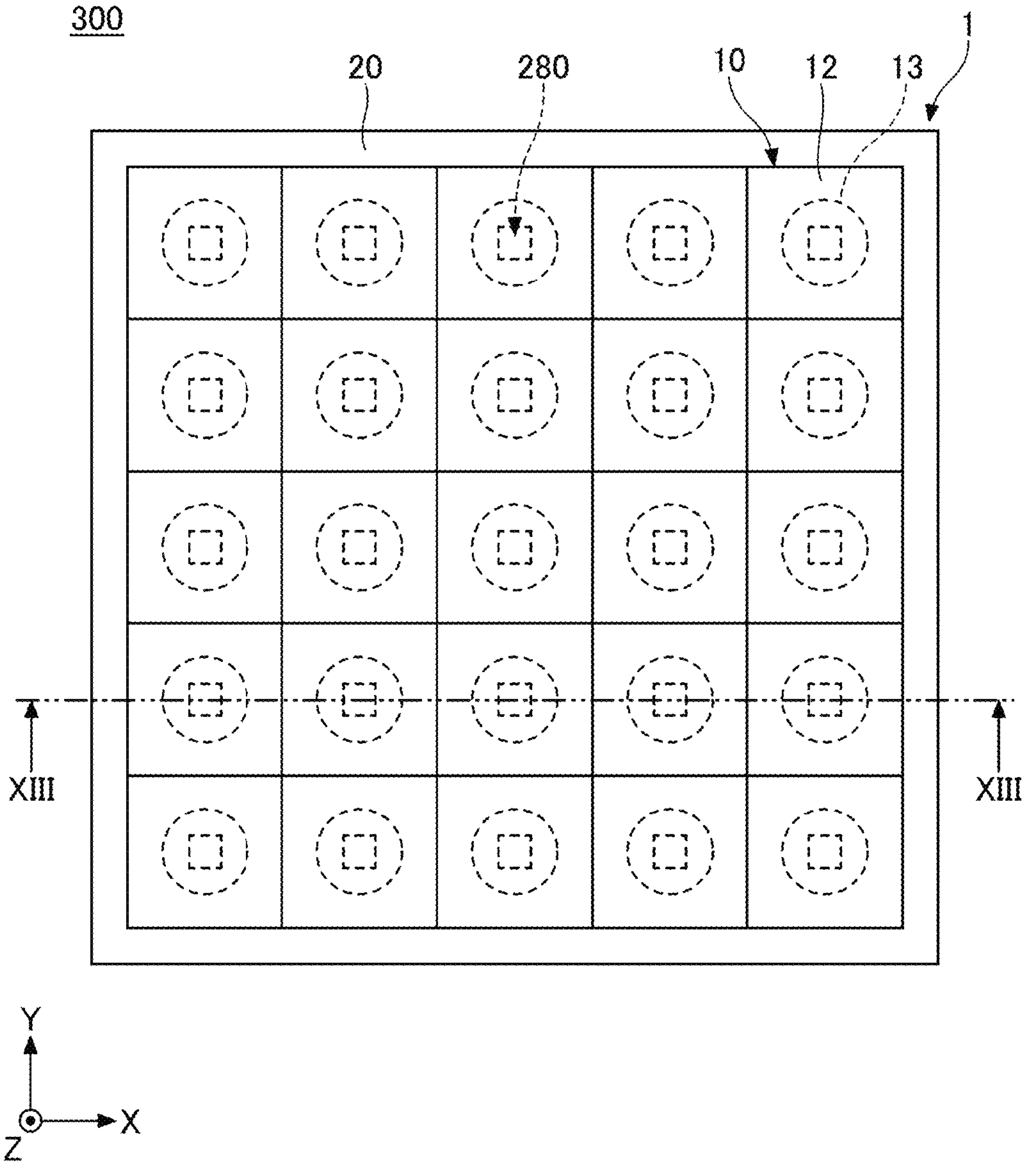
FIG. 12 is a schematic plan view of a light source module including the planar light source and the optical member.
Figure 13:
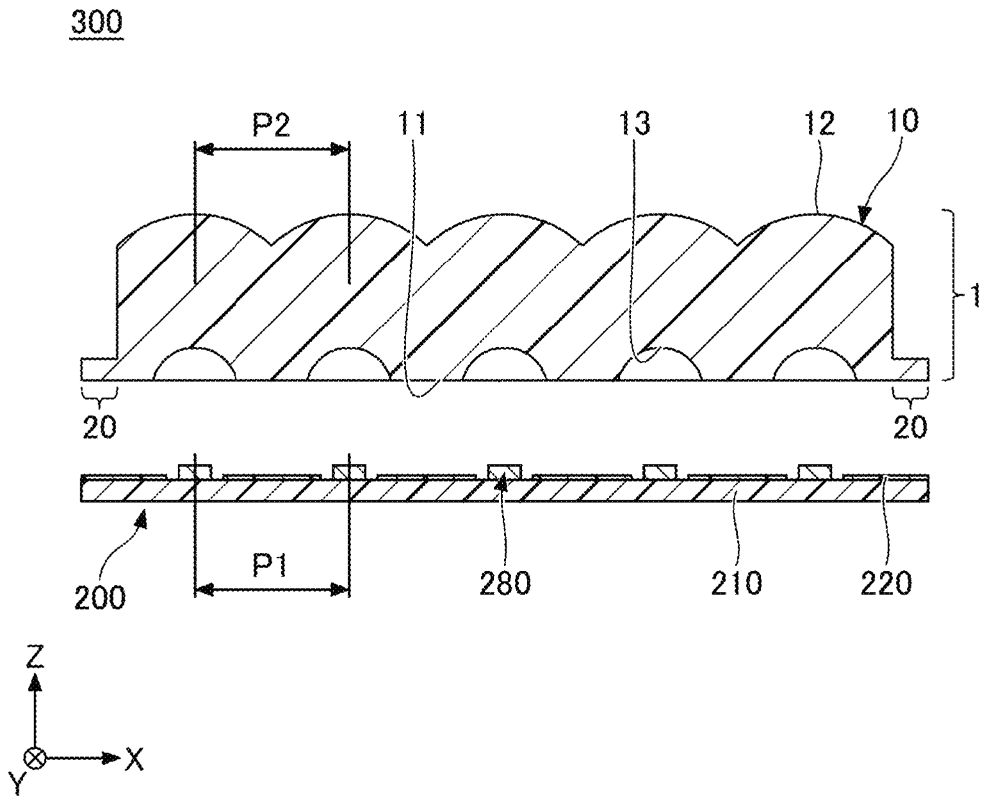
FIG. 13 is a schematic cross-sectional view of the light source module taken through line XIII-XIII of FIG. 12.

FIG. 12 is a schematic plan view of the light source module including the planar light source and the optical member. FIG. 13 is a schematic cross-sectional view of the light source module including the planar light source and the optical member, taken through line XIII-XIII of FIG. 12.

As illustrated in FIG. 12 and FIG. 13, a light source module 300 includes the planar light source 200 and the optical member 1. The optical member 1 is disposed above the light sources 280 of the planar light source 200. For example, the planar light source 200 and the optical member 1 are held by a housing so as to have a predetermined positional relationship.

In the example of FIG. 12 and FIG. 13, the number of light sources 280 are the same as the number of light controllers 10 in the light source module 300. The light sources 280 preferably overlap respective concave surfaces 13 of the light controllers 10 disposed above the light sources 280 in a plan view. When the light sources 280 overlap the concave surfaces 13 of the light controllers 10 in a plan view, it means that light emission surfaces of the light sources 280 overlap the concave surfaces 13 of the light controllers 10 in a plan view.

In FIG. 13, a pitch P1 is a distance connecting the centers of two adjacent ones of the light sources 280 in the X-axis direction in a plan view. A pitch P2 is a distance connecting the centers of two adjacent ones of the light controllers 10 in the X-axis direction in a plan view. The pitch P1 between the two adjacent ones of the light sources 280 is preferably equal to the pitch P2 between the two adjacent ones of the light controllers 10 in the X-axis direction of the light source module 300. Further, a pitch between two adjacent ones of the light sources 280 is preferably equal to a pitch between two adjacent ones of the light controllers 10 in the Y-axis direction of the light source module 300. Accordingly, the entirety of light emitted from the light sources 280 is easily emitted to the concave surfaces 13, and thus the utilization efficiency of the light can be improved.

In the light source module 300, the number of the light sources 280 may be less than the number of the light controllers 10. For example, the light sources 280 may be light sources having light emitting surfaces, each of which is divided into a plurality of regions. In this case, the light sources 280 preferably overlap the concave surfaces 13 of the light controllers 10 in a plan view. That is, the plurality of regions of the light emitting surfaces of the light sources 280 preferably overlap the concave surfaces 13 of the light controller 10 in a plan view.

Further, in the light source module 300, the number of the light sources 280 may be greater than the number of the light controllers 10. For example, two light sources 280 may be disposed at positions that overlap one concave surface 13 in a plan view.

In the light source module 300, light emitted from the light sources 280 travels vertically and obliquely upward from the light sources 280, and is incident on the concave surfaces 13 of the light controllers 10 positioned above the light sources 280. The light incident on the concave surfaces 13 is condensed by the light controllers 10 and emitted from convex surfaces 12 to the outside of the light source module 300.

As described above, even when a positional deviation occurs between the optical axis of a light source 280 and the center of a light controller 10, the optical member 1 allows the amount of change in the peak angle of light emitted from the light controller 10 to be very small. Therefore, even when a positional deviation occurs between the optical axis of the light source 280 and the center of the light controller 10 in the light source module 300, the amount of change in the peak angle of light emitted from a convex surface 12 of the light controller 10 can be reduced.

Figure 14:
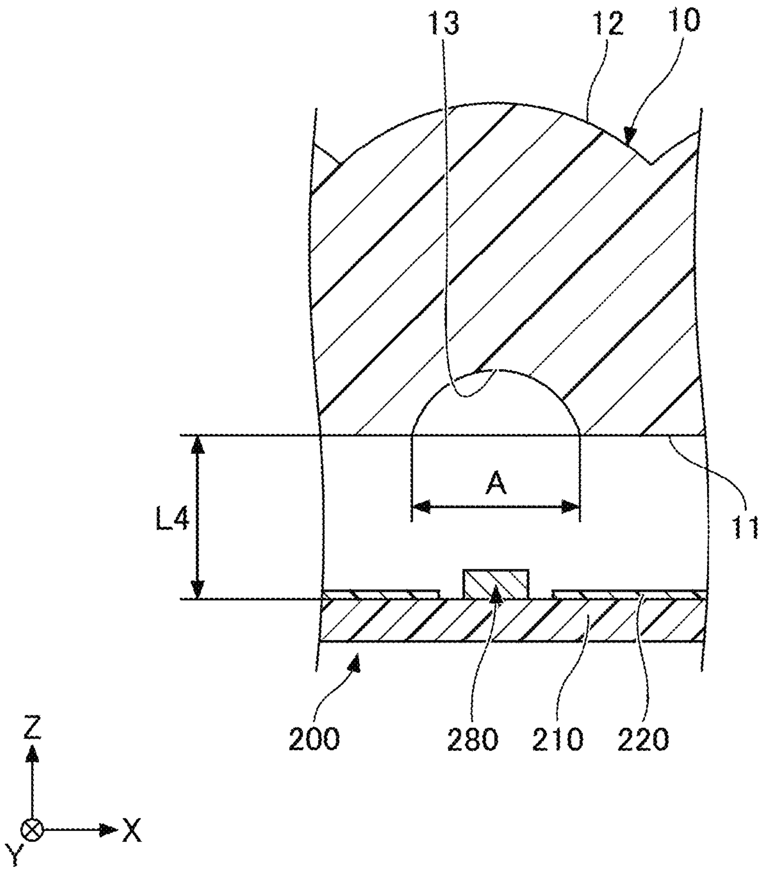
FIG. 14 is a diagram illustrating a preferred distance between the upper surface of a substrate and a first surface of a light controller.

In the example of FIG. 14, an opening of a concave surface 13 has a circular shape having a diameter A in a plan view. In this case, the shortest distance L4 between the upper surface of the substrate 210 and the light controller 10 is preferably A/2 tan θ or less, where θ is an angle that is one-half of the half-value angle of light emitted from the light source 280. If the light source 280 has Lambertian light distribution, the half-value angle is 120 degrees, and thus θ is 60 degrees. When the shortest distance L4 between the upper surface of the substrate 210 and the first surface 11 of the light controller 10 has such a relationship, substantially all of the light from the light source 280 is incident on the concave surface 13, and thus the utilization efficiency of the light can be improved. The shortest distance L4 may be zero. A part of or the entirety of the light source 280 in the thickness direction may be located above the plane including the first surface 11.

Members included in the planar light source 200 will be described in detail.

(Substrate 210)

The substrate 210 is a member for mounting a plurality of light sources 280. Conductor wiring for supplying power to the light sources 280 is disposed on the upper surface of the substrate 210.

Examples of the material of the substrate 210 include ceramics, resins, composite materials, and the like. Examples of the resins include phenol resins, epoxy resins, polyimide resins, BT resins, polyphthalamide (PPA), polyethylene terephthalate (PET), and the like. Examples of the composite materials include a mixture of any one of the above resins and glass fiber, silicon oxide, titanium oxide, aluminum oxide, or the like, and a metal substrate in which a metal member is coated by an insulating layer.

The thickness of the substrate 210 can be appropriately selected. The substrate 210 may be either a flexible substrate that can be manufactured by roll-to-roll processing or a rigid substrate. The rigid substrate may be a bendable thin rigid substrate.

A light reflecting member 220 is preferably provided on the uppers surface of the substrate 210 and around the light sources 280. The light reflecting member 220 is preferably composed of an insulating material. As the material of the light reflecting member 220, a material including one or both of: a mixture of any of the resins exemplified as the material of the substrate 210 and a filler such as barium titanate, titanium oxide, aluminum oxide, silicon oxide, or zinc oxide; and any of the resins exemplified as the material of the substrate 210 and containing a plurality of micro air bubbles can be used.

In a case where the light source module 300 includes the planar light source 200 and the optical member 1, by providing the light reflecting member 220 on the upper surface of the substrate 210, light emitted upward from the light sources 280 and reflected downward by the optical member 1 is reflected upward again by the light reflecting member 220 and is incident on the optical member 1. As a result, the light extraction efficiency of the light source module 300 can be improved.

(Light Source 280)

Figure 15:
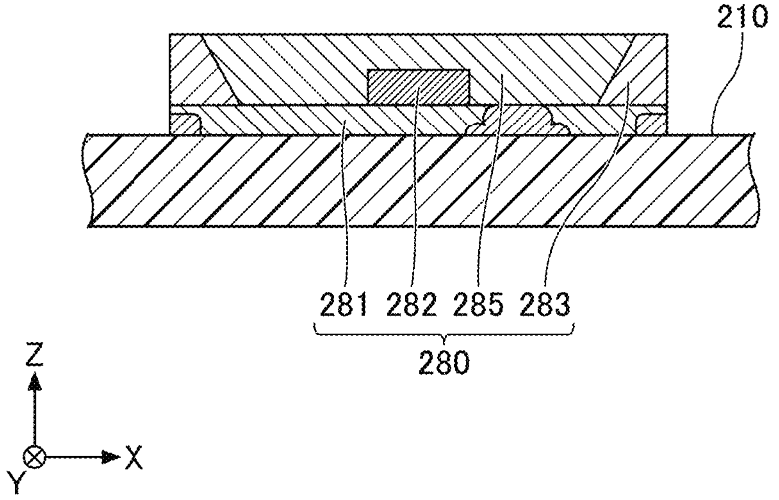
FIG. 15 is a schematic cross-sectional view of a light source included in the planar light source.

FIG. 15 is a schematic cross-sectional view of a light source included in the planar light source. A light source 280 has a quadrangular shape in a plan view; however, the light source 280 may have a circular shape or the like. The upper surface of the light source 280 is a light emission surface.

In the example of FIG. 15, the light source 280 is a light emitting device that includes a lead, a resin molded body, and a light emitting element. In the light emitting device, for example, a portion of a pair of plate-shaped leads 281 is embedded in a resin molded body 283. The resin molded body 283 has a recessed portion defined by a bottom surface and lateral surfaces, a portion of the bottom surface defining the recessed portion is constituted by a portion of the pair of leads 281, and the lateral surfaces have reflecting surfaces having a predetermined inclination angle.

A space between the pair of leads 281 is filled with the resin molded body 283, and constitutes part of the bottom surface defining the recessed portion. The resin molded body 283 has, for example, a quadrangular shape in a plan view. A portion of the pair of leads 281 is exposed as an external terminal on the lower surface of the resin molded body 283. In the light emitting device, a light emitting element 282 may be mounted in the recessed portion, and the light emitting element 282 may be covered by a sealing member 285.

As a base material constituting the leads 281, for example, a plate-shaped body including at least one kind of a metal selected from copper, aluminum, gold, silver, tungsten, iron, and nickel, an alloy such as an iron-nickel alloy and phosphor bronze, or a clad material can be used. In order to efficiently extract light from the light emitting element 282, a film including (for example, a film formed by plating) silver, aluminum, gold, or an alloy thereof may be formed on each of the surfaces of the leads 281. The metal film formed on each of the surfaces of the leads 281 may be a single layer film or a multilayer film.

A resin including a thermosetting resin or a thermoplastic resin can be used for the resin molded body 283. In particular, the thermosetting resin is preferably used. As the thermosetting resin, it is preferable to use a resin having lower gas permeability than a resin used for the sealing member 285. Specific examples of the thermosetting resin include an epoxy resin, a silicone resin, a modified epoxy resin such as silicone-modified epoxy resin, a modified silicone resin such as an epoxy-modified silicone resin, a polyimide resin, a modified polyimide resin, a urethan resins, and a modified urethane resin. The resin molded body 283 may contain glass fiber, titanium oxide, aluminum oxide, silicon oxide, or the like.

The light emitting element 282 is mounted on, for example, the bottom surface defining the recessed portion. The light emitting element 282 is fixed to the leads 281 by, for example, a bonding member. The light emitting element 282 includes a pair of positive and negative electrodes, and the pair of positive and negative electrodes are respectively electrically connected to the pair of leads 281 via wires. The light source 280 can emit light by receiving power from the outside via the pair of leads 281.

As the light emitting element 282, it is preferable to use a light emitting diode, for example. As the light emitting element 282, a light emitting element having an appropriate wavelength can be selected. For example, the light emitting element 282 emits blue light, green light, or red light. The light emitting element 282 includes a semiconductor stack. The semiconductor stack includes an n-type semiconductor layer, a p-type semiconductor layer, and a light emitting layer interposed therebetween. The light emitting layer may have a structure such as a double heterojunction or a single quantum well (SQW), or may have a structure with a group of active layers, such as a multiple quantum well (MQW) structure. The semiconductor stack may include a plurality of light emitting layers. For example, the semiconductor stack may have a structure including two or more light emitting layers between an n-type semiconductor layer and a p-type semiconductor layer, or may have a structure in which a structure sequentially including an n-type semiconductor layer, a light emitting layer, and a p-type semiconductor layer is repeatedly stacked multiple times. If the semiconductor stack includes a plurality of light emitting layers, the plurality of light emitting layers may have different peak emission wavelengths, or light emitting layers having the same peak emission wavelength may be included in the semiconductor stack. As the light emitting element 282, a light emitting element using a nitride-based semiconductor such as GaN, InGaN, AlGaN, or AlInGaN can be used. Further, as a red light emitting element, GaAlAs, AlInGaP, or the like can be used. Further, a semiconductor light emitting element formed of any other material may be used. The composition, the emission color, the size, and the number of light emitting elements to be used can be appropriately selected according to the purpose.

The light emitting element 282 is covered by the light-transmissive sealing member 285. As the sealing member 285, a resin having good heat resistance, weather resistance, and light resistance is preferably used. Examples of such a resin include a silicone resin, a modified silicone resin, an epoxy resin, a modified epoxy resin, a urea resin, a phenol resin, an acrylic resin, a urethane resin, a fluorine resin, and a resin including two or more of these resins.

The sealing member 285 can be mixed with at least one selected from the group consisting of a filler, a pigment, and a phosphor in order to impart a predetermined function. As the filler, barium titanate, titanium oxide, aluminum oxide, silicon oxide, zinc oxide, or the like can be suitably used. Further, the sealing member 285 may contain an organic or inorganic coloring dye or a coloring pigment for the purpose of transmitting a desired wavelength range. Further, the sealing member 285 may contain a phosphor.

If the sealing member 285 contains a phosphor, the sealing member 285 functions as a wavelength conversion member. The wavelength conversion member absorbs at least a portion of light emitted from the light emitting element 282, and emits light having a wavelength different from a wavelength of the light emitted from the light emitting element 282. For example, the wavelength conversion member converts a wavelength of a portion of blue light from the light emitting element 282, and emits yellow light. With such a configuration, white light is obtained by mixing blue light that has passed through the wavelength conversion member and yellow light emitted from the wavelength conversion member.

The light source 280 may be the light emitting element 282 instead of the light emitting device as illustrated in FIG. 15. In this case, the light emitting element 282 may include a light reflective film on the upper surface thereof. The light reflective film may be any of a metal film, such as silver or aluminum, a dielectric multilayer film, a resin containing a filler such as barium titanate, titanium oxide, aluminum oxide, silicon oxide, or zinc oxide, or a combination of these. Further, a light-transmissive sealing member may be provided on the upper surface of the substrate 210 so as to cover the light emitting element 282. As the material of the sealing member, an epoxy resin, a silicone resin, or a mixture of these resins, glass, or the like can be used. Among these, a silicone resin is preferably used, considering its light resistance and ease of forming. The sealing member may include a diffusing agent for diffusing light from the light emitting element 282, a coloring agent corresponding to the emission color of the light emitting element 282, or the like. Any diffusing agent and coloring agent publicly-known in the art can be used.

Figure 16:
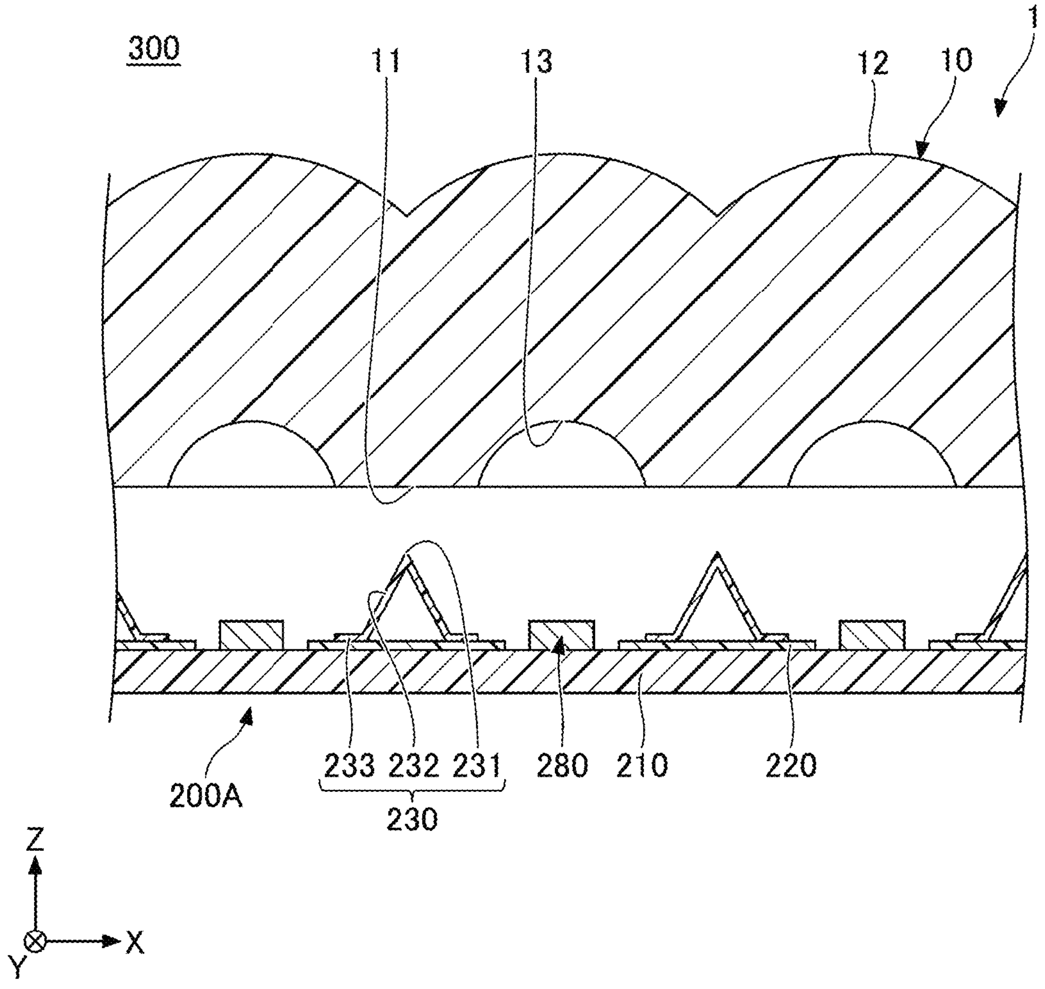
FIG. 16 is a schematic cross-sectional view of a light source module including a planar light source and the optical member.

FIG. 16 is a schematic cross-sectional view of a light source module including a planar light source and the optical member. A light source module 300 as illustrated in FIG. 16 may include a planar light source 200A instead of the planar light source 200. The planar light source 200A differs from the planar light source 200 in that the planar light source 200A includes partition members 230.

The partition members 230 are disposed on the same side of the substrate 210 as light sources 280. The partition members 230 include top portions 231 arranged in a grid pattern in a top view, wall portions 232 surrounding the light sources 280 in a top view, and bottom portions 233 connected to the lower ends of the wall portions 232. The partition members 230 include a plurality of regions surrounding the light sources 280. For example, each of the wall portions 232 of the partition members 230 extends from a corresponding top portion 231 toward the substrate 210, and a region surrounded by opposing wall portions 232 becomes narrower toward the substrate 210 in a cross-sectional view. One light source 280 is disposed in one section surrounded by the wall portions 232. However, two or more light sources 280 may be disposed in one section. The partition member 230 may be separated from the optical member 1, or the top portions 231 of the partition members 230 may contact the optical member 1.

The partition members 230 preferably have light reflectivity. Accordingly, light emitted from the light sources 280 can be efficiently reflected toward the optical member 1 by the partition members 230. In this case, the partition members 230 may be formed by using a resin or the like containing a light reflective material such as titanium oxide, aluminum oxide, or silicon oxide, or may be formed by using a resin containing no reflective material and then disposing a reflective material on the surfaces of the partition members 230. Alternatively, a resin containing a plurality of micro air bubbles may be used. In this case, the interfaces between the air bubbles and the resin reflect light. Examples of the resin used for the partition members 230 include thermoplastic resins such as an acrylic resin, a polycarbonate resin, a cyclic polyolefin resin, polyethylene terephthalate, polyethylene naphthalate, and polyester, and thermosetting resins such as an epoxy resin and a silicone resin. The partition members 230 are preferably set such that the reflectance to light emitted from the light sources 280 is 70% or more.

In the light source module 300 described above, the planar light source includes the substrate; however, the substrate can be provided as necessary and can be omitted. For example, the light source module 300 can include a planar light source in which a plurality of light emitting elements are held by an integral light-transmissive resin or the like.

Further, the light source module 300 may include a second optical member above the optical member 1. Examples of the second optical member include a diffusion sheet. Providing the light source module 300 with the diffusion sheet can improve the uniformity of light extracted from the light source module 300 to the outside. The diffusion sheet may be provided between the optical member 1 and the planar light source 200 or the planar light source 200A.

Other examples of the second optical member include a deflection prism. Providing the light source module 300 with the deflection prism can cause the optical axis of light extracted from the light source module 300 to the outside to be deflected in a predetermined direction. The light source module 300 may include both the deflection prism and the diffusion sheet at different positions in the Z-axis direction.

According to an embodiment of the present disclosure, in a case where a light controller of an optical member is disposed above a light source, an optical axis deviation caused by a positional deviation between the light source and the light controller can be reduced in the optical member.

Although embodiments have been described in detail above, the above-described embodiments are non-limiting examples, and various modifications and substitutions can be made to the above-described embodiments without departing from the scope described in the claims.

What is claimed is:

1. An optical member comprising:

a plurality of light controllers, each including:

- a first surface,
- a convex surface that is located opposite to the first surface and is curved in a direction away from the first surface, and
- a concave surface that opens at the first surface and is curved from the first surface toward the convex surface, wherein:

a radius of curvature of the concave surface is less than a radius of curvature of the convex surface, in a plan view, a center of the concave surface coincides with a center of the convex surface, and a first distance from the first surface to a topmost portion of the convex surface is 4.5 times or more a second distance from the first surface to a deepest portion of the concave surface, and the first distance is 0.8 mm or more and 16 mm or less, and the second distance is 0.17 mm or more and 3.4 mm or less.

2. The optical member according to claim 1, wherein the first distance is six times or less the second distance.

3. The optical member according to claim 1, wherein the radius of curvature of the concave surface is 2/7 times or more and ½ times or less the radius of curvature of the convex surface.

4. The optical member according to claim 1, wherein the concave surface overlaps the convex surface in the plan view.

5. The optical member according to claim 1, further comprising a projecting portion located between adjacent ones of the plurality of light controllers and extending in the direction away from the first surface.

6. The optical member according to claim 5, wherein a third distance from the first surface to a topmost portion of the projecting portion is longer than the first distance.

7. The optical member according to claim 1, further comprising a recessed portion located between adjacent ones of the plurality of light controllers and recessed toward the first surface.

8. A light source module comprising:

a planar light source including a substrate, and a plurality of light sources arranged on the substrate; and the optical member of claim 1 disposed above the plurality of light sources.

9. The light source module according to claim 8, wherein, in the plan view, each of the plurality of light sources overlaps a respective one of the concave surfaces.

10. The light source module according to claim 8, wherein a pitch between adjacent ones of the plurality of light sources is equal to a pitch between adjacent ones of the plurality of light controllers.

11. The light source module according to claim 9, wherein a pitch between adjacent ones of the plurality of light sources is equal to a pitch between adjacent ones of the plurality of light controllers.

12. The light source module according to claim 8, wherein:

an opening of the concave surface has a circular shape having a diameter A, and a shortest distance between an upper surface of the substrate and the first surface is A/2 tan θ or less, where θ represents a half-value angle/2 of light emitted from a corresponding one of the plurality of light sources.

13. The light source module according to claim 9, wherein:

an opening of the concave surface has a circular shape having a diameter A, and a shortest distance between an upper surface of the substrate and the first surface is A/2 tan θ or less, where θ represents a half-value angle/2 of light emitted from a corresponding one of the plurality of light sources.

14. The light source module according to claim 10, wherein:

an opening of the concave surface has a circular shape having a diameter A, and a shortest distance between an upper surface of the substrate and the first surface is A/2 tan θ or less, where θ represents a half-value angle/2 of light emitted from a corresponding one of the plurality of light sources.

15. The light source module according to claim 11, wherein:

an opening of the concave surface has a circular shape having a diameter A, and a shortest distance between an upper surface of the substrate and the first surface is A/2 tan θ or less, where θ represents a half-value angle/2 of light emitted from a corresponding one of the plurality of light sources.

16. The optical member according to claim 1, wherein:

the plurality of light controllers includes a first light controller adjacent to multiple other light controllers, and an entirety of a periphery of the convex surface of the first light controller directly contacts peripheries of the convex surfaces of the other light controllers.

* * * * *